United States Patent [19]

Dickopp et al.

[11] 3,932,710

[45] Jan. 13, 1976

[54] RECORD DISC FOIL SUPPORT SYSTEM WITH CHARGE LEAKAGE MEANS

[75] Inventors: Gerhard Dickopp; Benno Jahnel, both of Berlin, Germany

[73] Assignee: TED Bildplatten Aktiengesellschaft, AEG-Telefunken, TELDEC, Zug, Switzerland

[22] Filed: Apr. 2, 1974

[21] Appl. No.: 457,177

[30] Foreign Application Priority Data
Apr. 11, 1973 Germany............................ 2318870

[52] U.S. Cl.............. 179/100.4 R; 360/99; 360/97; 360/135; 317/2 F
[51] Int. Cl.².... G11B 9/08; G11B 5/12; H05F 3/00
[58] Field of Search .............. 360/99, 97, 135, 137; 179/100.4 R; 178/6.6 A; 317/2 A, 2 F

[56] References Cited
UNITED STATES PATENTS
3,191,179   6/1965   Pelech ............................ 360/104
3,767,865   10/1973   Schuller................................ 360/99

*Primary Examiner*—Bernard Konick
*Assistant Examiner*—Alan Faber
*Attorney, Agent, or Firm*—Spencer & Kaye

[57] ABSTRACT

In a recording or playback system in which information is stored along a spiral track on a flexible record carrier foil which rotates at a high velocity on an air cushion above a stabilization surface, and playback is to be effected according to the pressure sensing technique, the adverse effects of static electrical charges which can be created when frictional contact occurs between the foil and points on the stabilization surface are eliminated by providing the stabilization surface with a grounded electrically conductive region in the vicinity of the path followed by a signal transducer along a radius of the foil plane as it traces the sprial track and by causing the foil to be closer to the conductive region than to the mass of the transducer.

12 Claims, 3 Drawing Figures

RECORD DISC FOIL SUPPORT SYSTEM WITH CHARGE LEAKAGE MEANS

BACKGROUND OF THE INVENTION

The present invention relates to a recording or playback device of the type in which a rotating record carrier foil is held, by a flowing gaseous medium disposed between a stabilization surface and the foil, in the vicinity of the stabilization surface, and in which a unit for recording or playing back is movable above the foil transverse to its direction of advancement.

Picture record systems are known which operate according to the pressure scanning principle, where information is stored on an electrically nonconductive record carrier foil in the form of deformations, or undulations, disposed along a spiral track. In order to play back the signal recording, the foil is moved beneath a pressure pickup and the pickup moves so that its motion combined with that of the foil causes the pickup to follow the spiral track. Fluctuations in the pressure force on the pickup caused by the deformations in the foil are converted into corresponding electrical signals by a transducer. In order to be able to produce a perfect signal reproduction, it is necessary that physical oscillations and vertical wobble of the foil be substantially prevented.

It is known to produce a smooth, vibration-free movement of the foil by rotating the foil at high speed at a slight distance above a stationary stabilization surface, which can be a planar plate. A thin cushion of air forms between the foil and the stabilization surface and air in the cushion exhibits a net outward flow so that the foil is held at a slight distance above the stabilization surface. With a given rate of rotation and appropriate design of the portion of the stabilization surface which determines the quantity of air passing outwardly, it is possible to counteract local changes in shape of the foil by corresponding local increases or decreases in pressure in the cushion of air. The foil and the cushion of air are in a stable equilibrium.

With such arrangements, it sometimes occurs, on occasion periodically, that the foil brushes against the stabilization surface or even that the foil adheres to the stabilization surface.

This interference with the steady movement of the foil is caused mainly by the effect of electrostatic charges which may form on the foil and on the stabilization surface. They not only interfere with the steady movement but also lead to discharges through the pressure pickup which produce interference in the playback of the recorded picture.

U.S. Pat. No. 3,767,865 issued to Schüller et al, discloses a manner of solving this problem by providing means which substantially prevent the formation of an influence charge on the surface of the stabilization surface when the record carrier is electrostatically charged and thus prevent the formation, within the air cushion, of an electric field which could cause the carrier to adhere to the stabilization surface. This can be effected either by providing the stabilization surface with a sufficiently thick layer of an insulating material on its side facing the underside of the record carrier or by providing a record carrier foil which moves above a metallic stabilization surface with a coating of conductive material on its bottom surface.

In the latter case no electrical field can form in the cushion of air between the stabilization surface and the underside of the foil if the stabilization surface is conductively connected with the underside of the foil. While this can be considered to be the ideal arrangement, it is difficult to realize in practice, since, inter alia, a conductive foil coating has an adverse influence on the foil flexibility characteristics required for high quality signal reproduction by the pressure scanning process. The application of such a coating would also increase the cost of manufacturing the record carrier foils.

A picture record player operating with a record carrier foil without a conductive coating operates satisfactorily only if neither the foil nor the stabilization surface becomes strongly electrostatically charged, if no impurities such as dust are present on either part, and if the foil is free of dents.

SUMMARY OF THE INVENTION

It is thus an object of the present invention to improve the quiet, or steady, movement of record carriers of the type described above.

A more specific object of the invention is to reduce the influence of electrostatic charges during the playback of foils without it being necessary to coat the foils with an electrically conductive coating.

These and other objects are accomplished according to the present invention by providing such a stabilization surface with at least one region of lesser, and at least one region of higher, electrical conductivity. According to an advantageous embodiment of the present invention, the region with higher electrical conductivity protrudes from the stabilization surface in the direction toward the foil and has a curved outline.

The generation of electrostatic charges in picture record recording and playback systems can be explained as follows:

Unavoidable deposits of dirt on the stabilization surface form points of friction for the foil. At these points the friction produces a separation of charges, a charge of one polarity being produced at the point of the impurity on the stabilization surface and a charge with the opposite polarity adhering to the underside of the foil. The rotation of the nonconductive foil causes the latter charge to be transported along with the foil. At the same time new charges are continuously produced at the point of friction while the charge of the underside of the foil becomes distributed entirely around the foil.

If the stabilization surface is only poorly conductive, the charge of the one polarity thereon remains concentrated at the point of friction and is responsible for the creation of an electric field in the vicinity of the point of friction. With a foil of a thickness of only about 0.1 mm and a low dielectric constant, e.g. $\epsilon_r = 3$, a field will also be formed in the air space above the foil. The resulting electric field intensity may be so high that the air above the foil is ionized. In this case the charge carriers in the foil, which are of opposite polarity to the charge producing the field, flow in the direction toward the region where the latter charge is concentrated. The foil material ahead of this charge prevents the opposite polarity charge carriers from reaching the generating charge in order to neutralize it. Instead, the opposite polarity charge carriers are deposited on the foil surface from where they cannot flow off in a short time because of the poor volume, or bulk, conductivity and surface conductivity thereof.

Since the opposite polarity charge carriers are subsequently carried away from the friction point by the rotation of the foil, the field conditions in the vicinity of the point of friction are not changed, at least to a first approximation. The charge carriers are thus transported away from the point of friction and toward the pressure pickup, where annoying discharges will most likely occur since this is where the distance between the foil surface and the mass presented by the recording or scanning transducer is shortest and forces are lacking which would be produced by the concentrated charge producing a field in the vicinity of the point of friction and which would hold the opposite polarity charge carriers to the upper surface of the foil.

As outlined above, unavoidable electrostatic charges occur in the nonconductive foil and these, on the one hand, are a cause of interruption of the air cushion and, on the other hand, produce annoying discharges through the pickup when the above-mentioned favorable conditions are not present, which is generally the case during normal operation.

The present invention is therefore based on the following considerations: on the one hand, the charging of the foil, and thus also the discharging process, can be prevented if the charge which is concentrated on the stabilization surface at the point of friction has a way to flow off, for example via a conductive connection between the point and ground; and on the other hand, the discharges through the pickup can be positively prevented if a certain region of the stabilization surface is connected to ground with good electrical conduction and if the distance between this region of the stabilization surface and the foil is less than the distance between the foil and the mass of the pressure scanning and pressure transducing device.

It is important for the proper operation of the stabilization surface according to the present invention that this region be only large enough that the braking forces caused by electrostatic charges on the foil during movement of the foil will not be annoyingly noticed. The curved shape of the electrically conductive region is selected so that the distance between the conductive region of the stabilization surface and the underside of the record carrier foil is a minimum to create optimum conditions for maintaining the conductive connection between the stabilization surface and the record carrier foil at this point. The curved shape assures that the conductive regions present preferred paths for discharges because of the small distance which they establish between the foil and the stabilization surface.

The curved shape has the further advantage that dirt deposits will form at specially provided defined points outside of the location of the scanning operation so that sources of interference can be directly eliminated in this way.

The conductive region of the stabilization surface preferably consists of a metallic surface coating which can be produced, for example, by electroplating, by a conductive lacquer or by lamination. Due to the better scanning conditions which can be obtained along the crest line of the stabilization surface curvature, it is favorable to have one crest line of the curvature extend substantially below the path of the recording or playback means, the crest line of the curvature assumed by the foil during rotation substantially coinciding with the radial path along which the recording or playback means moves.

According to an advantageous further embodiment of the present invention a symmetrical structure which favors the quiet movement of the foil is produced by arranging at least three curved regions with good electrical conduction in the form of a star on the stabilization surface, the regions radiating from the axis of rotation of the foil.

In order to produce air flow conditions which stabilize the movement of the foil, it is favorable in this case for the curvature to be provided to present a support surface for the foil and a shearing edge for the component of the flowing gaseous medium which is parallel to the direction of movement of the foil, the contact surface being disposed ahead of the crest line, when seen in the direction of movement of the foil, and the shearing edge being disposed behind the crest line.

The crest line of the curvature in this case is advantageously parallel to the shearing edge.

According to an advantageous specific embodiment of the present invention, the crest line of the curvature protrudes by more than 1 mm from the stabilization surface, the support surface is at least 12 mm long in the direction of movement of the foil and has a radius of curvature of more than 100 mm in the direction of movement of the foil.

The distance between the shearing edge and the substantially parallel crest line is favorably 2 mm. The minimum cushion of flowing medium has a thickness of less than 2/10 mm, the region with good electrical conduction being disposed at that point where, during operation, the cushion of flowing medium is thinner than the average under the entire foil surface.

These above-mentioned favorable embodiments of the present invention were obtained by suitable experiments and examinations.

DESCRIPTION OF THE PREFERRED EMBODIMENTS

Figure 1:
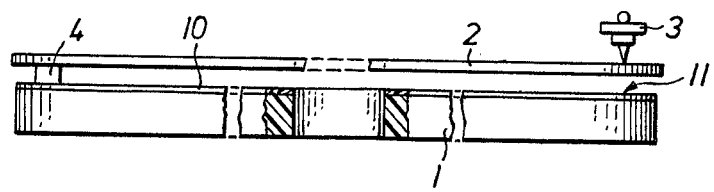
FIG. 1 is a schematic cross-sectional view of a playback device with the axis of rotation of the foil being indicated, used to explain the present invention.

In the system depicted schematically in FIG. 1, a pressure pickup 3 is guided radially to follow the spiral groove of a record carrier foil 2 as the foil rotates, the pickup travelling along a radius which is fixed with respect to a member defining a stabilization surface 1. A point of friction 4 disposed at the same distance from the record axis as the pickup 3 and caused by soiling (shown to an enlarged scale) causes a separation of charges, as described above. The charge produced at the stationary point of friction 4 can flow off to ground along a metallic region 10 on the stabilization surface 1. The opposite polarity charge remaining on foil 2 is transported together with foil 2 and thus comes to be below pickup 3.

The stabilization surface 1 is also provided with an electrically conductive region 11 beneath the path of pickup 3, this region being electrically conductively connected to ground. Its distance from the foil is less, however, than that between the foil and the mass of the pressure transducer device so that an eventual discharge is effectively prevented from taking place through the pickup system which constitutes the playback means.

Figure 2:
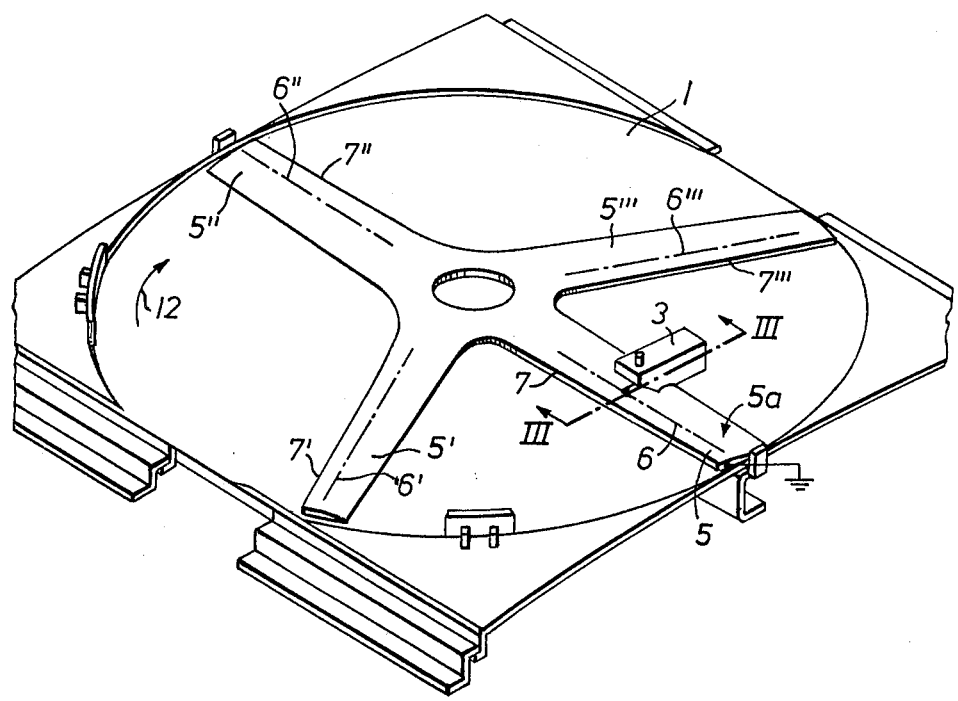
FIG. 2 is a perspective view of an embodiment of the invention with a stabilization surface having four conductive regions.

The stabilization surface 1 of the playback device shown in FIG. 2 is provided with four curved members 5, 5', 5'' and 5''', corresponding in physical form to a previous proposal. According to the present invention, these curved members have electrically conductive surfaces connected to a suitable ground.

During operation of the system, the foil 2 rotates at 1500 rpm above the stabilization surface 1. Above the curved portions which can be considered to be flow-producing cylinders so to speak, a very thin cushion of air of no more than 2/10 mm thickness is formed in the region of the radial crest lines 6, 6', 6'' and 6'''. The distance between foil 2 and one crest line of one curved portion is of the order of magnitude of 10 – 20μ near the circumference of the foil. The curved portions, when considered in the direction of movement of the foil 2, as indicated by arrow 12, are provided with shearing edges 7, 7', 7'' and 7''' behind the crest lines for the streams of air forming the minimal cushions, the shearing edges being substantially tangential to the direction of movement of the foil 2 above the crest lines.

In the region of the shearing edges, which are substantially parallel to the crest lines, the above-mentioned points of friction may form. However, these points of friction are no longer able to adversely influence the quiet movement of the foil and the quality of the signal reproduction since, due to the electrically conductive curved members, the resulting electrostatic charges are concentrated thereat and can no longer cause interference. The electrical conductivity can be provided by a metallic coating which is applied by electroplating, printing or vapor-deposition. The embodiment shown in FIG. 2 has been found to be particularly favorable with respect to deposits of impurities.

Figure 3:
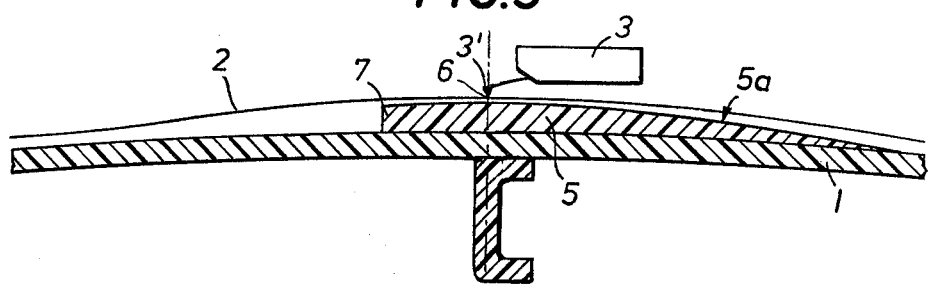
FIG. 3 is a cross-sectional view along the line III—III of FIG. 2.

Referring to FIG. 3, a recording or playback signal transducer 3 is guided, with its stylus 3' in contact with the foil surface, transversely to the recorded tracks on the circular foil 2, i.e. normal to the plane of the drawing, the tracks being in the form of a continuous spiral, for example, and the foil being rotated about its axis by an axially disposed support plate, not shown. The stabilization surface 1 is provided with curved members, the member 5 being shown, which form support surfaces 5a for the foil 2. The surface 5a shown in FIG. 3 has a crest line 6 and is provided with a shearing edge 7 which is parallel thereto and is at least 2 mm behind the peak line.

During operation, the foil 2 rotates at a high speed, e.g. 1500 rpm, the foil having a diameter, for example, of 20 to 30 cm, above the stabilization surface 1. This is known to produce a flow of the medium, e.g. air, disposed between the two objects. Compared to prior art arrangements, a strong flow component is forced in this instrument tangentially to the direction of movement of the foil by the curved surface 5 protruding from the stabilization surface 1. In the region of the crest line 6 of the support surface 5a the flow lines are compressed. This produces, analogously to the influence of a cylinder in the path of flow, a subatmospheric pressure above the curved surface which pulls the foil close to the curved portion. Above the crest line there forms a stable cushion of air of no more than 2/10 mm thickness and the thickness of the air cushion becomes minimal a few millimeters in front of and behind, along the direction of foil rotation, the line of radial movement of stylus 3' so that the distance between foil 2 and curved surface 5 at those points is of the order of magnitude of about 10μ. The edge 7 provides a defined break-off of the tangential flow component sufficiently behind the line of movement of the stylus 3' so that the break-off turbulence remains without influence on the playback quality.

If the system is operating perfectly, foil 2 does not physically contact surface 5a. The stable cushion of air may be disturbed, however, by small particles or deformations protruding either from foil 2 or from surface 5a, effecting physical contact of the two parts. As a consequence, the separation of electrostatic charges may result.

It has been found in experiments that if the curved member 5 does not have a shearing edge 7, the point of tangential flow transition travels between the air cushion above the curved portion 5 and the air cushion above the remaining stabilization surface 1. This produced undesirable height fluctuations in the region of the line of movement of the stylus 3'. Since a very short distance is required below the line of the element for recording or playing back, it does not matter that outside the region of curvature 5 the foil moves away from the stabilization surface 1 by an amount of up to several millimeters. On the contrary, with such a great distance the influence of dirt deposits is reduced. With heavy soiling, dirt will also be deposited on the curved portion 5. However, experiments with a foil of 210 mm diameter indicated that this occurs only at the shearing edges.

The stabilization surface of an apparatus for recording or playing back signals which is provided with curved members as described above improves the quiet movement of the foil under the recording or playback stylus, and thus the playback quality. In addition, the strong guiding effect of the curved surfaces as a result of the formation of a strong flow component tangential to the direction of movement produces a minimum cushion in the region of the line of movement of the stylus which is substantially independent of the setting of the height of the support plate.

The deposits of dirt at defined points which are harmless to the playback permits easy cleaning of the stabilization surface and thus the directed elimination of a source of interference. The stabilization surface provided with the above-described curved members can be produced either as an injection molded piece, or ridges with the appropriate profile may subsequently be applied to the possibly curved stabilization surface.

The system according to the invention can be employed to advantage in any of the presently known recording or playback systems which involve use of flexible foil record discs and pressure playback transducers.

It will be understood that the above description of the present invention is susceptible to various modifications, changes and adaptations, and the same are intended to be comprehended within the meaning and range of equivalents of the appended claims.

We claim:
1. In a signal transducing system having a member defining a stabilization surface and arranged to cause a rotating record carrier foil to be held in the vicinity of the stabilization surface by a cushion formed by a gaseous medium flowing between the rotating record carrier foil and the stabilization surface, the system including signal transducing means arranged to cooperate with the foil and mounted to be radially movable across the foil, the improvement wherein said member defining a stabilization surface comprises a body of electri- cally nonconductive material extending to said surface, and said system comprises means disposed on said surface and presenting strip-shaped, radially extending regions having high electrical conductivity.

2. An arrangement as defined in claim 1 wherein said means comprises metallic surface coatings constituting said high conductivity regions.

3. An arrangement as defined in claim 1 wherein said means comprise curved members protruding in the direction toward the foil and constituting said high conductivity regions.

4. An arrangement as defined in claim 3 wherein at least one of said curved members is formed to present a crest line which protrudes at least 1 mm above the portion of said stabilization surface adjacent said member.

5. An arrangement as defined in claim 3 wherein at least one of said curved members is formed to present a crest line located substantially beneath, and parallel to, the path followed by the transducing means during its radial movement across the foil.

6. An arrangement as defined in claim 3 wherein there are at least three said curved members constituting high electrical conductivity regions, said members being angularly offset from one another about the axis of rotation of the foil.

7. An arrangement as defined in claim 3 wherein at least one of said members constituting said high conductivity region is provided with a support surface for the foil and with a shearing edge for the gaseous medium component flowing parallel to the direction of movement of the foil, said edge being located behind said support surface, with respect to the direction of foil movement in the region of said member, and said member is formed to present a crest line located between said support surface and said edge.

8. An arrangement as defined in claim 7 wherein said support surface has a length of at least 12 mm in such direction of foil movement.

9. An arrangement as defined in claim 7 wherein said support surface has a radius of curvature of more than 100 mm in the direction of foil movement of the foil.

10. An arrangement as defined in claim 7 wherein said shearing edge is substantially parallel to said crest line and is spaced therefrom by a distance of at least 2 mm.

11. An arrangement as defined in claim 7 wherein said one member is formed so that when a foil is rotating thereabove at operating speed, the minimum thickness of the cushion of medium flowing above said crest line is less than 2/10 mm.

12. An arrangement as defined in claim 1 wherein at least one said region of high electrical conductivity is disposed at a location where, during operation with a foil rotating thereabove at operating speed, the cushion of flowing medium is thinner than the average over the entire stabilization surface.

* * * * *